US010753338B2

(12) United States Patent
Miranda et al.

(10) Patent No.: US 10,753,338 B2
(45) Date of Patent: Aug. 25, 2020

(54) CONTROL OF A MULTI-ROTOR WIND TURBINE SYSTEM USING A CENTRAL CONTROLLER TO CALCULATE LOCAL CONTROL OBJECTIVES

(71) Applicant: VESTAS WIND SYSTEMS A/S, Aarhus N (DK)

(72) Inventors: Erik Carl Lehnskov Miranda, Randers SV (DK); Tobias Gybel Hovgaard, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 163 days.

(21) Appl. No.: 15/561,318

(22) PCT Filed: Mar. 22, 2016

(86) PCT No.: PCT/DK2016/050087
§ 371 (c)(1),
(2) Date: Sep. 25, 2017

(87) PCT Pub. No.: WO2016/150447
PCT Pub. Date: Sep. 29, 2016

(65) Prior Publication Data
US 2018/0100488 A1 Apr. 12, 2018

(30) Foreign Application Priority Data

Mar. 23, 2015 (DK) ................... 2015 70162

(51) Int. Cl.
*F03D 7/04* (2006.01)
*G05B 15/02* (2006.01)
*F03D 1/02* (2006.01)

(52) U.S. Cl.
CPC ............. *F03D 7/047* (2013.01); *F03D 7/045* (2013.01); *G05B 15/02* (2013.01);
(Continued)

(58) Field of Classification Search
CPC . F03D 7/047; F03D 1/02; F03D 7/045; G05B 15/02; G05B 2219/2619;
(Continued)

(56) References Cited

U.S. PATENT DOCUMENTS 8,332,077 B2    12/2012  Kondo et al.
2003/0168864 A1  9/2003  Heronemus et al.
(Continued)

FOREIGN PATENT DOCUMENTS

CN    101247049 A    8/2008
CN    102725520 A    10/2012
(Continued)

OTHER PUBLICATIONS

Chinese Office Action for Application No. 201660023698.6 dated Oct. 22, 2018.
(Continued)

*Primary Examiner* — Thomas C Lee
*Assistant Examiner* — Anzuman Sharmin
(74) *Attorney, Agent, or Firm* — Patterson + Sheridan, LLP

(57) ABSTRACT

The present invention relates to control of a wind turbine system comprising a plurality of wind turbine modules mounted to a common support structure, i.e. to control of a multi-rotor wind turbine system. The invention discloses a control system for a multi-rotor wind turbine system which comprises local controllers operable to control the wind turbine modules in accordance with local control objectives and a central controller configured to monitor the operation of the wind turbine system and based thereon calculate the local control objectives. The central controller is implemented as a model predictive controller (MPC).

14 Claims, 6 Drawing Sheets

(52) U.S. Cl.
CPC ... *F05B 2270/111* (2013.01); *F05B 2270/334* (2013.01); *F05B 2270/404* (2013.01); *G05B 2219/2619* (2013.01); *Y02E 10/723* (2013.01)

(58) Field of Classification Search
CPC .......... F05B 2270/111; F05B 2270/334; F05B 2270/404; Y02E 10/723
See application file for complete search history.

(56) References Cited

U.S. PATENT DOCUMENTS

| | | | | |
|---|---|---|---|---|
| 2003/0170123 | A1* | 9/2003 | Heronemus | F03D 1/02 |
| | | | | 416/41 |
| 2008/0086281 | A1 | 4/2008 | Santos | |
| 2012/0049516 | A1* | 3/2012 | Viassolo | H02P 9/04 |
| | | | | 290/44 |
| 2012/0051939 | A1* | 3/2012 | Marvin | F03D 1/04 |
| | | | | 416/244 R |
| 2013/0106107 | A1* | 5/2013 | Spruce | F03D 7/0224 |
| | | | | 290/44 |
| 2013/0127173 | A1 | 5/2013 | Lee et al. | |
| 2013/0297266 | A1* | 11/2013 | Brincker | G01H 1/006 |
| | | | | 703/1 |
| 2014/0178195 | A1* | 6/2014 | Blom | F03D 7/0268 |
| | | | | 416/1 |
| 2016/0108736 | A1* | 4/2016 | Schuring | F03D 1/0675 |
| | | | | 416/226 |
| 2016/0146190 | A1* | 5/2016 | Ravindra | F03D 7/048 |
| | | | | 290/44 |

FOREIGN PATENT DOCUMENTS

| | | |
|---|---|---|
| CN | 103291551 A | 9/2013 |
| CN | 203552029 U | 4/2014 |
| CN | 204082445 U | 1/2015 |
| GB | 2443886 A | 5/2008 |
| WO | 2006037576 A1 | 4/2006 |
| WO | 2011000453 A2 | 1/2011 |
| WO | 2013028172 A1 | 2/2013 |

OTHER PUBLICATIONS

Danish Patent and Trademark Office, Search Report, Danish Application No. PA 2015 70162 dated Sep. 21, 2015.
Patent Cooperation Treaty, International Search Report, Application No. PCT/DK2016/050087 dated Jun. 8, 2016.

* cited by examiner

A) Front    B) Front    C) Side    D) Top

CONTROL OF A MULTI-ROTOR WIND TURBINE SYSTEM USING A CENTRAL CONTROLLER TO CALCULATE LOCAL CONTROL OBJECTIVES

FIELD OF THE INVENTION

The present invention relates to control of a wind turbine system comprising a plurality of wind turbine modules mounted to a common support structure, i.e. a multi-rotor wind turbine system. In particular, the invention is directed to a system using local controllers for operation of the respective ones of the plurality of wind turbine modules to meet local control objectives, and a central controller to calculate the local control objectives.

BACKGROUND OF THE INVENTION

There exist a number of wind turbine types or designs. A common type of wind turbine is the three-bladed upwind horizontal-axis wind turbine (HAWT), in which the turbine rotor is at the front of the nacelle and facing the wind upstream of its supporting turbine tower. Another type is the multi-rotor array type wind turbine, where a plurality of wind turbine modules are mounted to a common support structure.

EP1483501 discloses a multi-rotor array-type wind turbine in which a plurality of co-planar rotors are mounted to a common support structure. In general, a multi-rotor wind turbine may achieve the economy of scale that can be obtained with a very large single rotor turbine, but has the potential to avoid the associated drawbacks such as high blade mass, scaled up power electronic components and so on. Nevertheless, although such a co-planar multi-rotor wind turbine has its advantages, it presents challenges to implement the concept in practice, particularly in how to control the multiple rotors to achieve optimum power production. EP1483501 approaches the control strategy by treating each wind turbine of the system as a separate item that is controlled individually.

It is against this background that the invention has been devised.

SUMMARY OF THE INVENTION

It would be advantageous to control a wind turbine multi-rotor system in a manner which takes into account any differences in the operational conditions the various wind turbine modules experiences, as well as any coupling between the wind turbine modules in connection with operation of the wind turbine system.

Accordingly, in a first aspect, there is provided a control system for a wind turbine system comprising a plurality of wind turbine modules mounted to a common support structure, the control system comprises:
  a local controller operable to control the operation of a respective one of the plurality of wind turbine modules, and to issue local control commands thereto to achieve a set of local control objectives;
  a central controller implementing a model predictive control (MPC) routine configured to monitor the operation of the wind turbine system and based on the operation of the wind turbine system calculate the set of local control objectives.

The present invention relates to control of a wind turbine system comprising a plurality of wind turbine modules mounted to a common support structure. The system may also be referred to as a multi-rotor wind turbine system, multi-rotor wind power system or simply as a multi-rotor wind turbine.

In the present invention, the operation of the wind turbine system is based on local controllers directed to achieve local control objectives, i.e. control objectives for each wind turbine module, where the local control objectives are calculated by model predictive controller (MPC).

Advantageously, the system of the invention enables each of the wind turbines to optimise their own performance by adhering to the local control objectives, while ensuring that the overall performance is within the centralised control objectives and performance targets. In this manner the performance can be improved for the wind turbine system as a whole, while taking into account any differences in operational conditions for the individual wind turbine modules.

The set of local control objectives is calculated using a MIMO (Multiple Inputs, Multiple Outputs) control routine implemented in the central controller, the MIMO controller being a model predictive control (MPC) routine. It is an advantage to calculate the local control objectives using an MPC algorithm, since MPC algorithms are well suited for taking multiple inputs into account to provide multiple outputs to fulfil a number of objectives, in a manner which ensures optimized operation of the system in relation to predefined criteria. Moreover, the multi-rotor structure due to its size tends to have fairly low natural tower frequencies and therefore prone to instability issues due to the desired gain of the controller. By use of an MPC routine to calculate the set of local control objectives, the controller gains are not limited by the natural frequency of the tower structure.

In a further aspect, the invention also relates to a multi-rotor wind turbine system. That is the invention relates to a wind turbine system comprising a plurality of wind turbine modules mounted to a common support structure, wherein each of the plurality of wind turbines modules includes a rotor and a power generation system driven by the rotor. The wind turbine system comprises a control system in accordance with the first aspect of the invention.

In an even further aspect, the invention also relates to a method of controlling a multi-rotor wind turbine system. The method comprises the steps of controlling the operation of a respective one of the plurality of wind turbine modules to achieve a set of local control objectives; monitoring the operation of the wind turbine system to determine a current operational state; and calculating based on the current operational state the set of local control objectives.

In a yet further aspect, the invention also relates to a computer program product comprising software code adapted to control a multi-rotor wind turbine system when executed on a data processing system. The computer program product being adapted to generating instructions to a local controller arranged to control the operation of a respective one of the plurality of wind turbine modules to achieve a set of local control objectives; monitoring the operation of the wind turbine system to determine a current operational state; and calculate based on the current operational state the set of local control objectives.

The computer program product may be provided on a computer readable storage medium or being downloadable from a communication network. The computer program product comprise instructions to cause a data processing system, e.g. in the form of a controller, to carry out the instruction when loaded onto the data processing system.

In general the various embodiments and aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
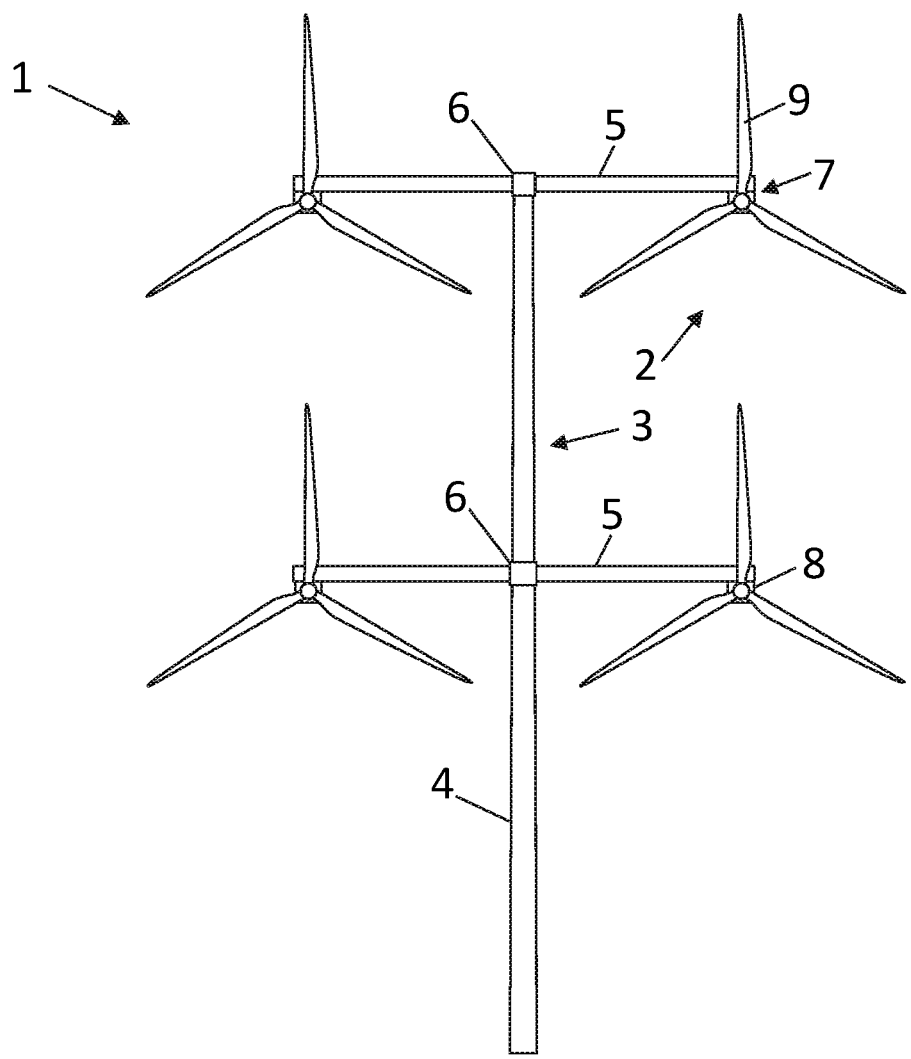
FIG. 1 illustrates an embodiment of a multi-rotor wind turbine system.

FIG. 1 illustrates an embodiment of a multi-rotor wind turbine system 1 comprising a plurality of wind turbine modules 2 mounted to a common support structure 3. Each wind turbine module is a wind turbine generating entity, and may in principle be the generating part of a common single-rotor wind turbine including rotor, generator, converter, etc., while the support structure 3 is a tower 4 comprising a support arm arrangements 5 for holding the wind turbine modules.

Each support arm arrangement 5 is mounted to the tower 4 at a mount portion (here shown together with a central bearing or rotatable joint 6) so that the support arm arrangement is able to rotate about the vertical axis of the tower. The central bearing may be implemented in a number of ways, and may be implemented as a rotatable coupling where wind turbine modules are e.g. rotated about the tower by means of thrust variations on the individual rotors. In an alternative embodiment, the central bearing may include a yaw drive capable of rotating the wind turbine modules around the tower. In embodiments, each of the wind turbine modules are fixed to the support arm and rotate/yaw as a pair around the tower, however each wind turbine module may also further comprise a dedicated yaw drive 7 for individual yaw of the module, either as an alternative to, or as an addition to, the central rotatable joint 6.

Each wind turbine module 2 includes a rotor that is rotatably mounted to a nacelle 8 in the usual way. The rotor has a set of three blades 9 in this embodiment. Three-bladed rotors are a common rotor configuration, but different numbers of blades are also known, including two bladed turbines. Thus, the wind turbine modules 2 are each able to generate power from the flow of wind that passes through the swept area or 'rotor disc' associated with the rotation of the blades.

Figure 2:
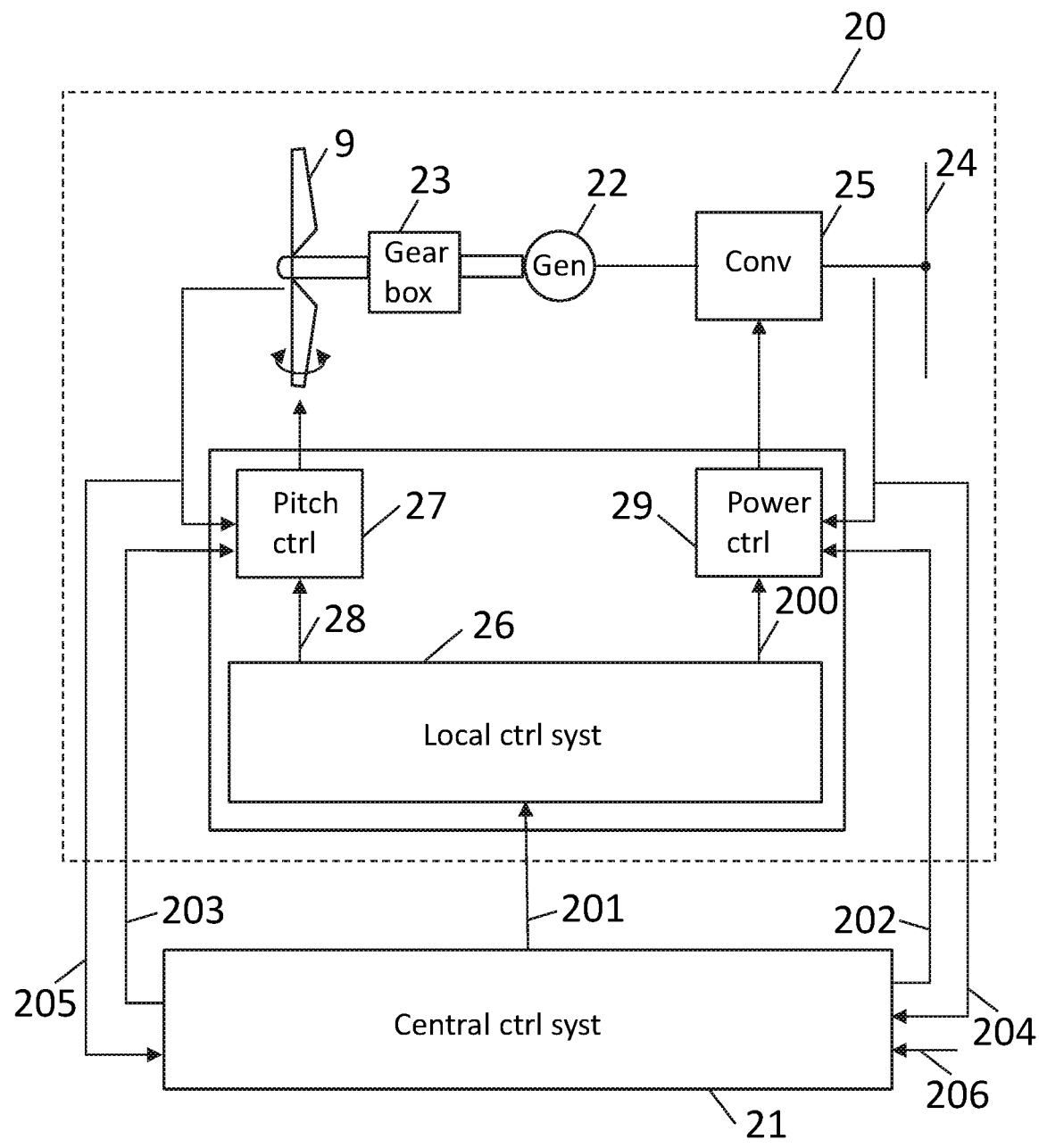
FIG. 2 illustrates an embodiment of a control system together with elements of a wind turbine module.

FIG. 2 schematically illustrates an embodiment of a control system together with elements of a wind turbine module. The figure illustrates elements 20 relating to a single wind turbine module 2, and example connections to a central controller 21.

The rotor blades 9 of each wind turbine module are mechanically connected to an electrical generator 22, here illustrated via a gearbox 23, however in general this may be obtained in any suitable way, such as via a direct drive connection or via a belt drive connection. The electrical power generated by the generator 22 is injected into a power grid 24 via an electrical converter 25. The electrical generator 22 can be a doubly fed induction generator or a full-scale converter, but other generator types may be used. Moreover, other embodiments exist for the grid connection, such as embodiments where a shared converter is used for all wind turbine modules of the multi-rotor wind turbine. Moreover, each wind turbine module may be directly connected to the grid as shown, or may be connected via an intermediate connection station.

The control system comprises a number of elements, including at least one local controller 26 with a processor and a memory, so that the processor is capable of executing computing tasks based on instructions stored in the memory, as well as computing tasks instructed by the central controller 21. In general, the local controller 26 ensures that in operation the wind turbine generates a requested power output level as defined by the local control objectives. This is obtained by adjusting the pitch angle and/or the power extraction of the converter. To this end, the control system 26 comprises or is connected to a pitch system including a pitch controller 27 using a pitch reference 28, and a power system including a power controller 29 using a power reference 200. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades. In the figure only two rotor blades are shown, however as mentioned in connection with FIG. 1, any number of rotor blades may be used.

Figure 3:
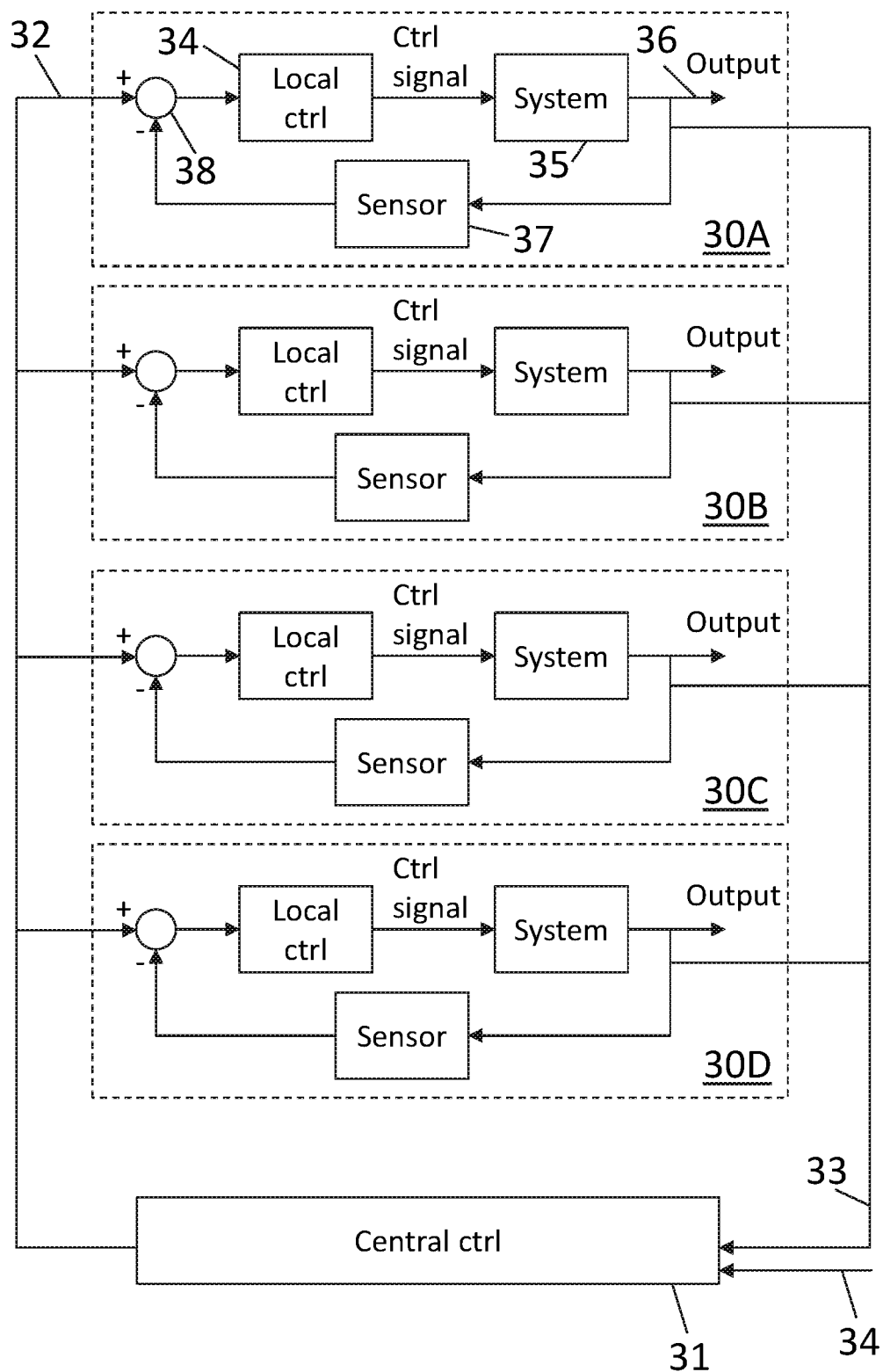
FIG. 3 illustrates embodiments of a control system, where each local controller is implemented as a control loop feedback controller.

FIG. 3 schematically illustrates an embodiment of a control system comprising a central controller 31 and four local controllers 30A-30D, one for each wind turbine module.

FIG. 3 illustrates embodiments of the local controllers, where each local controller is implemented as a control loop feedback controller, i.e. a PI or PID controller or any other controller of such type. In general, the local controller may be implemented to operate any suitable controller type, e.g. a local controller may also be implemented as a model predictive controller.

Irrespective of the controller type, the local controller is implemented to control the operation of a respective one of the plurality of wind turbine modules and to issue local control commands thereto to achieve a set of local control objectives. In an important embodiment, the local control objectives are set-points, such as pitch set-points or power set-points. In the illustrated embodiment, the local controller receives the local control objective 32, e.g. a pitch set-point. This pitch set-point is converted to a control signal by the local controller 34 and applied to the relevant system 35, here the pitch actuation system, which provides an output 36 in the form of a pitch pressure for a hydraulic pitch system or a voltage level for an electrical pitch system. The output is monitored by a sensor 37, and the sensor signal is compared 38 with the set-point 32 to generate an error signal that is applied to the control signal to be used by the local controller in the feedback loop.

In the present invention, in the context of the current embodiment, a central controller 31 is provided which monitors the operation of the wind turbine system and based on the operation of the wind turbine system calculates the set of local control objectives, i.e. the pitch set-points to be used by the local controllers in their control routines.

The local control objectives could also be other set-points, such as power set-point for the power system 29, 30 and rotor speed set-points. However the local control objectives could also be thrust signals, such a thrust limiting signals, vibration reducing signals, noise reducing signals, derate signals. Such signals would either by the central controller 31 or by an element of the local controller be translated into specific set-points for the actuation systems. With reference to FIG. 2, the central controller may instruct 201 a local controller which translates the instructions into set-points 28, 200. This may e.g. be the case if the central controller calculates overall objectives, such as derate instructions or vibration reducing instructions. The central controller may also instruct 202, 203 the actual actuating systems directly. This may e.g. be the case if the central controller calculates the set-points directly. In such a situation, there may not be a need to pass the set-points through a local controller. Control commands generally refer to any signal, instructions, set-points or other means used for operating the various elements of the wind turbine system.

The central controller 31 is implemented to calculate the local control objectives. This is based on the operation of the wind turbine system, and to this end, the central controller monitors, or receives monitor signals 204, 205, 33 related to the operation of the wind turbine system. Such monitor signals may e.g. be the various output signals from the various local system elements, however it could also be other signals 206, 34, e.g. directed to sensor signals, actuator signals, set-points, meteorological data, and signals from other wind turbine systems. In general, any signal which can be used for defining the operational state of the wind turbine system.

Reference is made to local or localized controller. This reference should be construed in a broad manner. The term local refers to that the controller is mainly related to a specific wind turbine module and the local conditions, signals, commands, computations, etc., of the given module. In the same manner, reference to central or centralized controller should also be construed broadly. Central mainly refers to conditions, signals, commands, computations, etc., common to, or taking into account, more, or even all, wind turbine modules.

In embodiments, the localised control means and the centralised control means may be implemented on a common computing device. So, in such a configuration, computing resources may be concentrated in a single physical location, which may improve reliability since sensing of data and transmission of data is focussed at a single point. The system may also therefore be more cost effective. In such a configuration, the localised control means and the centralised control means may be implemented on a common computing device, albeit functionally separated in suitable independent functional software modules. In alternative embodiments the localised control means and the centralised control means may be implemented on separate computing devices.

Where the localised control means and the centralised control means are implemented on separate computing devices, each one of the plurality of local control modules may be located at its respective wind turbine module, and the centralised control means may be located remote from the plurality of wind turbines, for example on the support structure.

The central controller 21, 31 is implemented as MIMO (Multiple Inputs, Multiple Outputs) controller in the form of a model predictive control (MPC) controller for calculating the local control objectives.

Figure 4:
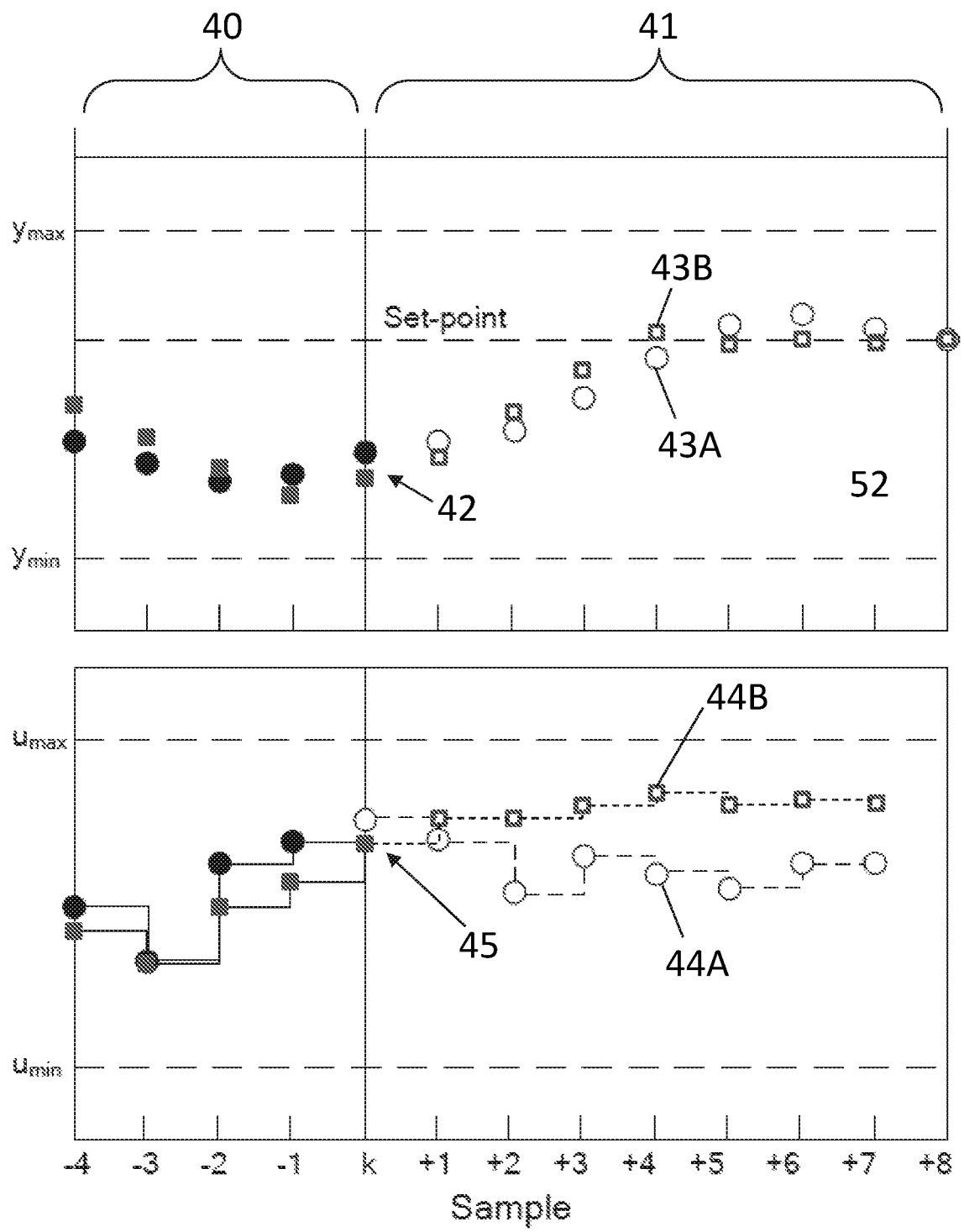
FIG. 4 shows general aspects of an MPC routine in relation to a measured operational variable y and an MPC calculated control variable u.

FIG. 4 shows general aspects of an MPC routine in relation to a measured operational variable y and an MPC calculated control variable u. The upper part of the figure shows two state trajectories for the variable $y_1$, 43A related to an operational variable of a first wind turbine module, and the variable $y_2$, 43B related to the same operational variable of a second wind turbine module. In general, for a multi-rotor system, an operational variable comes in a set corresponding to the number of wind turbine modules. Here two are shown as a schematic example.

In the lower part of FIG. 4 two control trajectories $u_1$, 44A and $u_2$, 44B are shown for the control variable u.

The operational trajectories and control trajectories may include, but are not limited to, one or more of the following parameters: pitch value, including collective pitch values and individual pitch values, rotor speed, rotor acceleration, tower movement, power related parameters, torque related parameters and derivatives of these parameters.

In an embodiment, the operational trajectory is a predicted operational state trajectory. A state is a collection, often expressed as a vector, of operational parameters. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \end{bmatrix}$$

comprising pitch value, θ, rotor angular speed, ω, and nacelle position, s, as well as time derivatives of those parameters. Other and more parameters may be used to define the wind turbine state, $x^*$, in particular a number of position sensors, or accelerometers may be used and attached to various parts of the support structure 3. Again, in a multi-rotor modular system, corresponding state vectors exist for each wind turbine module, or as an alternative a single state vector may be used which includes all the state variables of the wind turbine modules and the support structure.

The state values of the current operational state of the wind turbine may be based on measured sensor readings from sensors arranged to measure sensor data relating to the wind turbine's physical state values. Additionally, estimated values or calculated values may also be used. In an embodiment, the state may be determined by a state calculator, e.g. in the form of a dedicated computational unit in charge of determining the current operational state, such as an observer or a Kalman filter.

The trajectory may also be expressed as a control trajectory. An example control trajectory may be:

$$u_1^* = \begin{bmatrix} \theta_{ref} \\ P_{ref} \end{bmatrix}$$

comprising the pitch reference signal and the power reference signal for the given wind turbine local controller. Other and more parameters may be used to define the wind turbine control signal, $u_1^*$. The local control objectives are determined based on the control trajectory. Again, in a multi-rotor modular system, corresponding control trajectories exist for each wind turbine module, or as an alternative a single trajectory may be used which includes all control variables of the wind turbine modules.

FIG. 4 shows trajectories 43A, 43B of measured variables $y_1$ and $y_2$ for a number of discrete time steps. The figure shows the current time, k, as well as a number of past time steps 40 and a number of future time steps 41 (also sometimes referred to as the prediction horizon and the control horizon for the state variable y and the control variable u, respectively). Known variable values, i.e. based on already measured values, are marked with a solid mark (circle or square), whereas predicted variable values are marked with an open mark. A trajectory may comprise a time series of predicted values, i.e. only the open circles. The trajectories need not include the past and known values, but may do in certain embodiments. In particular, the current values 42, 45 may be included for trajectories of measured variables. The trajectory may span a time series of a few seconds, such as 5-10 seconds. However the trajectory may be longer or shorter depending on the given implementation.

As an example, the y-trajectories show the rotor speed w in a situation where a set-point is given to increase the rotor speed for two wind turbine modules. The trajectory shows the current rotor speed 42 together with the predicted future rotor speeds. Allowed maximum and minimum values are also shown for the illustrated variable. As can be seen the set-point is the same for the two turbine modules, but due to slight differences in the operating conditions, the trajectories are not identical.

FIG. 4 further illustrates an example of general control trajectories determined by use of an MPC algorithm. FIG. 4 illustrates the relationship between an operational state trajectory 43A, 43B and a general control trajectory 44A, 44B. In embodiments, the general control trajectory may be operational trajectories that are calculated using the predicted operational state trajectory.

While the current k-th value 42 is known for measured variables, the current value 45 of the control trajectory is calculated by use of the MPC routine. In embodiment, the current value of the control trajectory may be used directly as a local control objective.

The figure also shows maximum and minimum allowed values for the control trajectory values of u.

As an example, the trajectories shows the trajectory for the pitch angle, i.e. $u=\theta$. Thus a set-point is given to change the rotor speed, and as a consequence the pitch angle is changed.

Model Predictive Control (MPC) is a multivariable control algorithm that uses an optimization cost function J over the receding prediction horizon, to calculate the optimal control moves.

In an embodiment, the cost function of the model predictive control routine may comprise elements directed to isolated operation of each of the respective one of the plurality of wind turbines and at least one element directed to a cross-coupling between at least two of the plurality of wind turbines. As an example, the optimization cost function may be given by:

$$J = \sum_{n=1}^{N}\left(\sum_{i=1}^{m}\left(w_{y_{i,n}}(r_{i,n}-y_{i,n})^2 + w_{u_{i,n}}\Delta u_{i,n}^2\right) + w_{f_{1_n}}f_1(\bar{y}_n,\bar{u}_n) +, \ldots, +w_{f_{p_n}}f_p(\bar{y}_n,\bar{u}_n)\right) \quad \text{Eq. 1}$$

With reference to FIG. 4, $r_i$ is a set-point for the i-th of the m wind turbine modules, $y_i$, and $u_i$ being trajectory variables for the i-th of the m wind turbine modules, and $w_{y_i}$ being weight matrix defining the relative importance of this variable, and $w_{u_i}$ being weight matrix defining the penalty related to changes in this variable. Thus, the inner sum in J is related to each of the respective one of the plurality of wind turbines. The functions $f_1, \ldots, f_p$ are cross-coupling elements coupling the individual wind turbine modules with relevant measures, i.e. vibrations, bending moments, etc. of the supporting structure. The coupling functions can be described as functions of the trajectory variables $\bar{y}_n = [y_{i,n}]_{i=1}^{m}$ and $\bar{u}_n = [u_{i,n}]_{i=1}^{m}$. The weights $w_{f_{1_n}}, \ldots w_{f_{p_n}}$ define the importance of the coupling measures relative to each other and relative to the sum of the objectives for the individual wind turbines. Generally the cross-coupling may be related to a structural cross-coupling between at least two of the plurality of wind turbine modules. This may e.g. relate to that a vibration in one module will propagate to vibration in another module via the structural elements. The cross-coupling may also be an aerodynamic cross-coupling between wind turbine modules. As an example, the aerodynamic cross-coupling can be in terms of the maximum available power for each wind turbine module, i.e., the amount of power the rotor of a single one of the wind turbine modules is able to extract from the wind, at a certain wind speed, might depend on the amount of power the remaining wind turbine modules are extracting from the wind, as the overall wind field is affected by the amount of power extracted from the wind.

By implementing in the central controller an MPC routine to calculate the local control objectives an optimization problem over N time steps (the control and prediction horizon) is solved at each sample time. The result is an optimal input sequence for the entire horizon which may be used for controlling the multi-rotor turbine.

In an example embodiment, the optimization problem used for normal production has the form:

$$\bar{u}^*(t) = \text{argmin } J_0(S(t),P(t),C(t),U(t)),$$

a subject to the constraints:

$$\omega_{R_i} \leq \Gamma_{107_{R_i}} \; i \in \{1,2,\ldots,m\}\text{-}5 \leq \theta_{i,b} \leq 90, \; b \in \{1,2,3\}, \\ i \in \{1,2,\ldots,m\}\text{-}20 \leq \dot{\theta}_{i,b} \leq 20, \; b \in \{1,2,3\}, \; i \in \{1, \\ 2,\ldots,m\} P_{E_i} \leq 3 \; MW, \; i \in \{1,2,\ldots,m\}$$

and $$f_1(\bar{y},\bar{u}) \leq f_{1,max} \; P_E f_{2_i}(\bar{y},\bar{u}), \; i \in \{1,2,\ldots,m\}$$

The function argmin is the standard mathematical operator which stands for argument of the minimum, and finds points in the parameter space spanned by S, P, C, u and t where the cost function $J_0$ attains its smallest value. The parameter $\omega_R$ denotes the rotor speed with maximum value $\Gamma_{\omega_R}$, $\theta_i$ the pitch angle (with derivative) and $P_E$ refers to the power of the turbine. The first four constraints exemplify constraints on each of the respective one of the plurality of wind turbines and the final two constraints exemplify a constraint on the coupling measures. $f_1(\bar{y},\bar{u})$ might be root bending moment of the supporting structure with the maximum value $f_{1,max} \cdot f_{2_i}(\overline{y}, \overline{u})$ might describe the available power in the wind for the i-th wind turbine module as a function of the entire set of control and output trajectories.

In embodiments, the constraints used in the optimization process to calculate the set of local control objectives can be set based on the current operational state of the wind turbine. For example, should one turbine module stop operation, the power generation for that turbine module may be set to zero. Should a wind turbine module be derated for a specific reason, the derated power level may be set as a constraint. In general any appropriate operational state may be included in the optimization process as a constraint.

Here, the nominal cost function $J_0$ provides a trade-off between power (P), loads (S) and coupling measures (C) using the control signal $\overline{u}(t)$, while the constraints limit the rotor speed, blade pitch angle, blade pitch speed, and electrical power for each of the respective one of the plurality of wind turbines as well as the resulting root bending moment of the supporting structure. The control signal would typically consist of blade pitch angles and power reference for the converter:

$$\overline{u}(t) = \begin{bmatrix} u_1(t) \\ u_2(t) \\ \vdots \\ u_m(t) \end{bmatrix}, u_i(t) = \begin{bmatrix} \theta_1(t) \\ \theta_2(t) \\ \theta_3(t) \\ P_{ref}(t) \end{bmatrix}.$$

The MPC routine is a receding horizon routine which repeatedly calculates a receding horizon trajectory for the wind turbine system and where the set of local control objectives is determined based on the receding horizon trajectory.

In such an embodiment, at time t the current state is sampled and a cost-minimizing control strategy is computed for a time horizon in the future: [t, t+T], and then the turbine state is sampled again and the calculations are repeated starting from the new current state, yielding a new control trajectory and new predicted state trajectory.

The central controller thus determine a current operational state of the wind turbine system, and based on the current operational state calculates a predicted operational state trajectory of the wind turbine system, where the set of local control objectives is calculated using the predicted operational state trajectory. In particular the local control objectives may be determined as, or based on, the next control trajectory values 45 (see FIG. 4), possible together with the predicted future values of the predicted horizon.

In this manner it is ensured that each of the wind turbine modules are operated using an optimal trajectory taking into account overall operational targets.

Figure 5:
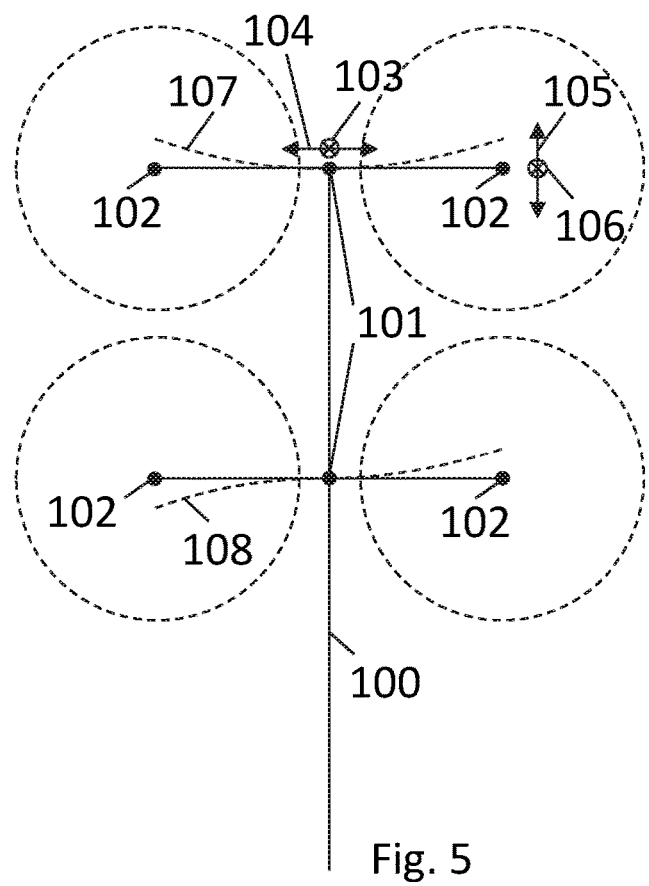
FIG. 5 illustrates example mode shapes of a schematic multi-rotor wind turbine system.

FIG. 5 illustrates an example of selected mode shapes of a schematic multi-rotor wind turbine system. In an embodiment, the structural cross-coupling between the at least two of the plurality of wind turbine modules is defined as a number of pre-determined mode shapes for the movement of the wind turbine modules and the support structure. FIG. 5 illustrates a model structure of a four rotor multi-rotor structure which is defined as a stiff structure comprising two tower nodes 101 and four module nodes 102. In an embodiment, the mode shape model defines vibrational modes of the coupled structure expressed in terms of the coupled movement of the six nodes. In an example each node may be provided with two degrees of movement, here "side-side"

vibration 104 and fore-apt vibration 103 for the tower nodes, and "up-down" vibration 105 and "in-out" rotation 106 for the module nodes.

FIG. 5 moreover illustrate two example mode shapes in the form of first and second order vibrational states for the support arms. In the first order vibrational state 107 each horizontal arm can vibrate up and down in the same direction, and in the second order vibrational state 108 each horizontal arm can vibrate up and down in different directions. A mode shape defines the motional equation of each node point based on a given vibrational state. Additional higher mode shapes including higher order vibrational states, as well as mode shapes including tower motional can be defined.

A motion equation of the structure can be defined as a dynamic model which link control actions with the vibrational states. For example a motion equation can be defined which models the force vector of a given pitch response and/or rotor speed value or change and the resulting movement of a node point. This can be modelled for each mode shape and a total motion equation can be provided as a superposition of the selected number of mode shapes.

Figure 6:
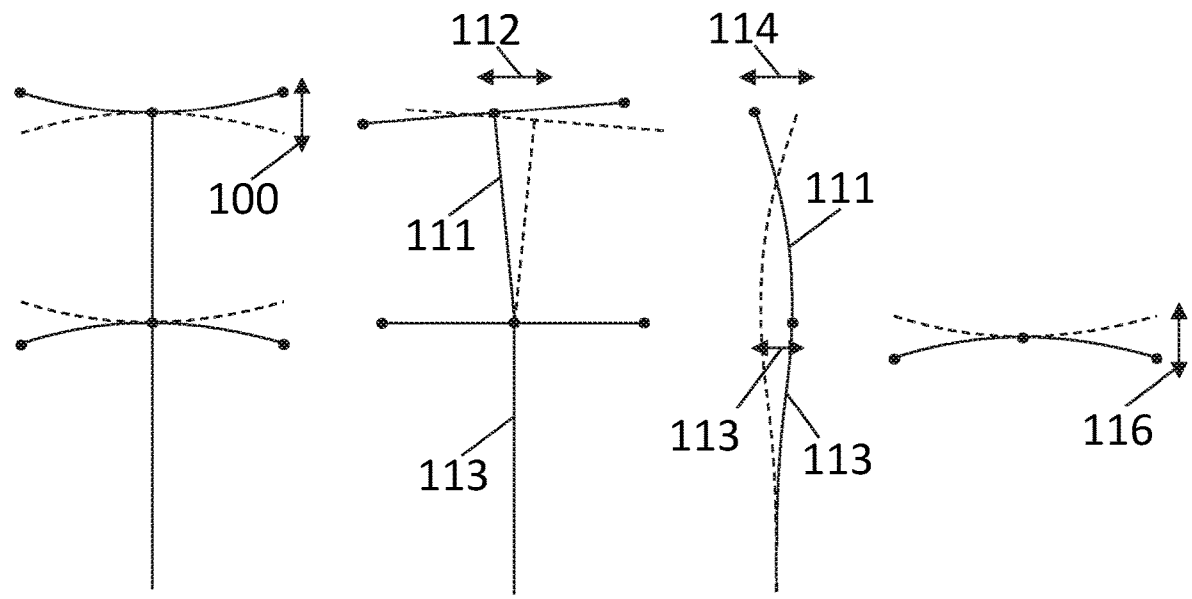
FIG. 6 illustrates further example mode shape.

FIG. 6 schematically illustrates an example of four example mode shapes that may be superposed into a combined motion of the multi-rotor structure. In FIG. 6A each support arm vibrates in and up-down manner in opposite movement 110. In addition to that, in FIG. 6B, the entire top section 111 vibrates in a side-side motion 112 on a fixed bottom section 113. In FIG. 6C fore-apt vibration is schematically illustrated in a side view, in an example mode shape where the top section 111 vibrates with a larger amplitude 114 than the amplitude 115 of the bottom section 113. Finally in FIG. 6D a top view shows a mode shape where the top support arm vibrates in an in-out 116 movement.

Having defined a motion equation for the structure, cost function elements, $f_p(\overline{y}_n, \overline{u}_n)$ of Eq. 1, can be defined which link a given control action at one wind turbine module with the remaining structure. Also a weight for each of such identified cross structural can be defined.

The complexity of the optimization is dependent upon the number of mode shapes that is included in the motion equation. It may be sufficient to only consider the most important mode shapes.

The number of mode shapes to be selected can be based on a vibrational frequency of the mode shape being less than a frequency limit. It may be sufficient to only include mode shapes having a vibrational low frequency. In this regard it may be sufficient to include mode shapes with a vibrational frequency less than 5 Hz, or even lower, such as less than 2 Hz or even less than 1 Hz.

Additionally or alternatively to this, the number of mode shapes to be selected can be based on a minimum level of vibrational energy being included in the selected number of mode shapes. For examples the mode shapes which contain at least 60% of the vibrational energy, or even more, such as at least 75% of the vibrational energy.

Additionally or alternatively to this, mode shapes may also be selected based on a structural analysis, so that the mode shapes which incur the most loads on the support structure or elements of the support structure can be selected. Such elements may be the tower, support arms, blades, or other elements. The load may as examples be determined as fatigue loads or maximum loads.

FIGS. 5 and 6 illustrate example mode shapes. The invention is not limited to these mode shapes. It is however within the capabilities of the skilled person to select appropriate mode shapes, the given number of mode shapes to include, as well as the number and nature of the node points used. Here sixe nodes are illustrated, in embodiments more or fewer modes mad be used.

Figure 7:
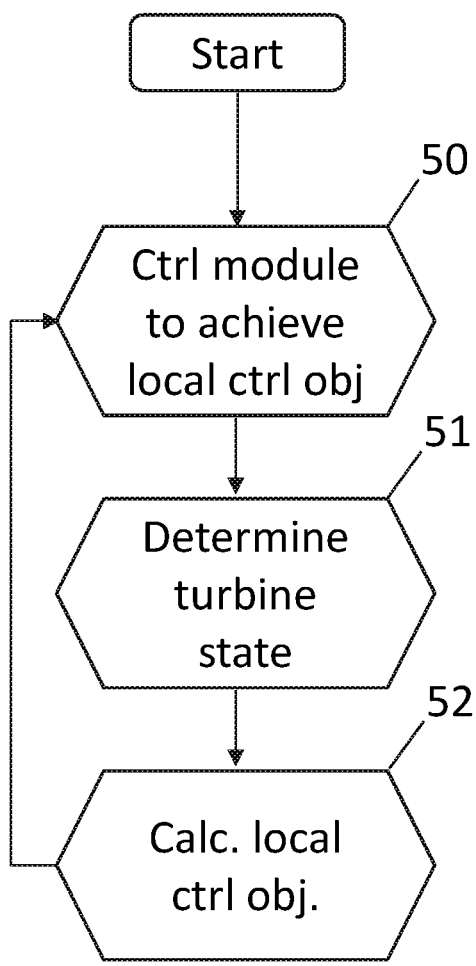
FIG. 7 illustrates overall steps that may be performed in a method of controlling a multi-rotor wind turbine system.

FIG. 7 illustrates overall steps that may be performed in a method of controlling a wind turbine system comprising a plurality of wind turbine modules. In the figure, it is illustrated that the operation of a respective one of the plurality of wind turbine modules is controlled 50 to achieve a set of local control objectives. This is done by a local controller which issues local control commands to the controllable entities of the wind turbine modules.

In a next step, the operation of the wind turbine system is monitored 51 to determine a current operational state.

Based on the current operational state, the set of local control objectives is calculated 52. This calculation is done by the MPC in the central controller.

Also, it should be appreciated that although the illustrated embodiment includes four wind turbine modules mounted to the support structure, this is to illustrate the principle of the proposed control system which may be applied to wind turbine systems with another number of wind turbine modules, both fewer than and more than four wind turbine modules. Moreover, embodiments are envisaged in which the wind turbines are not paired in groups of two, as in the illustrated embodiment, but are arranged differently and not necessarily having a co-planar relationship.

It should also be noted that only a single wind turbine system 1 is described here, but several such systems may be grouped together to form a wind power plant, also referred to as a wind farm or 'park'. In this case, a wind power plant control and distribution facility (not shown) would be provided to coordinate and distribute the power outputs from the individual wind turbine systems to the wider grid. Moreover, in such plant scenario may the central controller or part of the central controller be implemented on a plant level.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A control system for a wind turbine system comprising a plurality of wind turbine modules mounted to a common support structure, the control system comprising:
 a local controller operable to control an operation of a respective one of the plurality of wind turbine modules, and to issue local control commands thereto to achieve a set of local control objectives; and
 a central controller implementing a model predictive control (MPC) routine configured to monitor an operation of the wind turbine system and based on the operation of the wind turbine system calculate the set of local control objectives,
 wherein the MPC routine employs a cost function that comprises elements directed to isolated operation of each of the respective one of the plurality of wind turbine modules and at least one element directed to a cross-coupling between at least two of the plurality of wind turbine modules,
 wherein the cross-coupling includes a structural cross-coupling between at least two of the plurality of wind turbine modules.

2. The control system according to claim 1, wherein the model predictive control routine repeatedly calculates a receding horizon trajectory for the wind turbine system and wherein the set of local control objectives is determined based on the receding horizon trajectory for the wind turbine system.

3. The control system according to claim 1, wherein the central controller is further configured to determine a current operational state of the wind turbine system, and based on the current operational state calculate a predicted operational state trajectory of the wind turbine system, and wherein the set of local control objectives is calculated using the predicted operational state trajectory.

4. The control system according to claim 3, wherein the current operational state of the wind turbine system is included in the calculation of the set of local control objectives as constraints.

5. The control system according to claim 1, wherein the local controller is implemented as a control loop feedback controller.

6. The control system according to claim 1, wherein the local controller is implemented as model predictive controller.

7. The control system according to claim 1, wherein the structural cross-coupling between the at least two of the plurality of wind turbine modules is defined by a number of pre-determined mode shapes for movement of the wind turbine modules and the common support structure.

8. The control system according to claim 7, wherein the number of pre-determined mode shapes is selected based on a vibrational frequency of a mode shape being less than a frequency limit.

9. The control system according to claim 7, wherein the number of pre-determined mode shapes is selected based on a minimum level of vibrational energy being included in the selected number of pre-determined mode shapes.

10. The control system according to claim 7, wherein the number of pre-determined mode shapes is selected based on loads incurred by a mode shape on the common support structure or elements of the common support structure.

11. The control system according to claim 1, wherein the cross-coupling includes an aerodynamic cross-coupling between at least two of the plurality of wind turbine modules.

12. A wind turbine system comprising a plurality of wind turbine modules mounted to a common support structure, wherein each of the plurality of wind turbines modules includes a rotor and a power generation system driven by the rotor, wherein the wind turbine system further comprises:
 a local controller operable to control an operation of a respective one of the plurality of wind turbine modules, and to issue local control commands thereto to achieve a set of local control objectives; and
 a central controller implementing a model predictive control (MPC) routine configured to monitor an operation of the wind turbine system and based on the operation of the wind turbine system calculate the set of local control objectives,
 wherein the MPC routine employs a cost function that comprises elements directed to isolated operation of each of the respective one of the plurality of wind turbine modules and at least one element directed to a cross-coupling between at least two of the plurality of wind turbine modules,
 wherein the cross-coupling includes a structural cross-coupling between at least two of the plurality of wind turbine modules.

13. A method of controlling a wind turbine system comprising a plurality of wind turbine modules mounted to a common support structure, the method comprising:
controlling an operation of a respective one of the plurality of wind turbine modules to achieve a set of local control objectives;
monitoring an operation of the wind turbine system to determine a current operational state; and
calculating using a model predictive control (MPC) routine and based on the current operational state, the set of local control objectives,
wherein the MPC routine employs a cost function that comprises elements directed to isolated operation of each of the respective one of the plurality of wind turbine modules and at least one element directed to a cross-coupling between at least two of the plurality of wind turbine modules,
wherein the cross-coupling includes a structural cross-coupling between at least two of the plurality of wind turbine modules.

14. A non-transitory computer readable medium including computer program code that, when executed by one or more computer processors, performs an operation to control a wind turbine system comprising a plurality of wind turbine modules mounted to a common support structure, the operation comprising:
generating instructions to a local controller arranged to control an operation of a respective one of the plurality of wind turbine modules to achieve a set of local control objectives;
monitoring an operation of the wind turbine system to determine a current operational state; and
calculating using a model predictive control (MPC) routine and based on the current operational state, the set of local control objectives,
wherein the MPC routine employs a cost function that comprises elements directed to isolated operation of each of the respective one of the plurality of wind turbine modules and at least one element directed to a cross-coupling between at least two of the plurality of wind turbine modules,
wherein the cross-coupling includes a structural cross-coupling between at least two of the plurality of wind turbine modules.

* * * * *